US011803309B2

(12) United States Patent
Shah et al.

(10) Patent No.: US 11,803,309 B2
(45) Date of Patent: Oct. 31, 2023

(54) SELECTIVE COMPRESSION AND ENCRYPTION FOR DATA REPLICATION

(71) Applicant: International Business Machines Corporation, Armonk, NY (US)

(72) Inventors: Komal Shailendra Shah, Pune (IN); Bharti Soni, Jaipur (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 16/505,776

(22) Filed: Jul. 9, 2019

(65) Prior Publication Data

US 2021/0011637 A1    Jan. 14, 2021

(51) Int. Cl.
*G06F 3/06* (2006.01)
*G06F 21/60* (2013.01)
*G06F 21/62* (2013.01)

(52) U.S. Cl.
CPC ............ *G06F 3/0623* (2013.01); *G06F 3/065* (2013.01); *G06F 3/067* (2013.01); *G06F 3/0608* (2013.01); *G06F 3/0614* (2013.01); *G06F 21/602* (2013.01); *G06F 21/6245* (2013.01)

(58) Field of Classification Search
CPC .... G06F 3/0623; G06F 3/0608; G06F 3/0614; G06F 3/065; G06F 3/067; G06F 21/602; G06F 21/6245
USPC ......................................................... 713/193
See application file for complete search history.

(56) References Cited

U.S. PATENT DOCUMENTS

| | | | |
|---|---|---|---|
| 9,524,504 B2* | 12/2016 | Villars | G06Q 30/0269 |
| 10,067,952 B2* | 9/2018 | Ahrens | G06F 11/1451 |
| 2006/0048014 A1* | 3/2006 | Takahashi | G06F 11/2082 |
| | | | 714/E11.102 |
| 2014/0237201 A1 | 8/2014 | Swift | |
| 2016/0188419 A1 | 6/2016 | Dagar et al. | |
| 2017/0262221 A1 | 9/2017 | Zhao et al. | |
| 2017/0286224 A1* | 10/2017 | Resch | G06F 3/067 |

(Continued)

OTHER PUBLICATIONS

Qiu, "A User-Centric Data Protection Method for Cloud Storage Based on Invertible DWT", 2021, IEEE, pp. 1293-1303 (Year: 2021).*

(Continued)

*Primary Examiner* — Noura Zoubair
*Assistant Examiner* — Gregory A Lane
(74) *Attorney, Agent, or Firm* — Stosch Sabo

(57) ABSTRACT

Described herein are techniques for managing replication in a data storage environment. The techniques including selectively compressing and selectively encrypting, by a production site, a set of files for replication from the production site to a remote site. Files can be selectively compressed based on a compression ratio satisfying a compression threshold, and files can be selectively encrypted based on a file content satisfying an encryption criteria. The techniques can further include updating, by the production site, metadata associated with selectively compressed files and updating metadata associated with selectively encrypted files. The techniques can further include replicating the set of files for replication from the production site to the remote site, the set of files for replication including the selectively compressed and the selectively encrypted files.

18 Claims, 9 Drawing Sheets

(56) References Cited

U.S. PATENT DOCUMENTS

2018/0027006 A1    1/2018  Zimmermann et al.
2019/0014055 A1*   1/2019  Gupta ..................... H04L 47/50
2019/0109869 A1*   4/2019  Bailey ...................... H04L 9/14
2020/0099699 A1*   3/2020  Saad ................... G06F 11/2076

OTHER PUBLICATIONS

Mell et al., "The NIST Definition of Cloud Computing", Recommendations of the National Institute of Standards and Technology, Sep. 2011, 7 pages.

* cited by examiner

SELECTIVE COMPRESSION AND ENCRYPTION FOR DATA REPLICATION

BACKGROUND

The present disclosure relates to data storage, and, more specifically, to reliability, efficiency, and security in data backup and replication operations.

Data backup generally relates to creating snapshots of data and storing the snapshot on a disaster recovery site at periodic intervals (e.g., once per day). If the original data is corrupted, the data can be restored to a previous point in time using a previous snapshot. Data replication generally relates to nearly instantaneous copies of files in approximately real-time, where the copies can be transmitted to a disaster recovery site and can be granularly restored on an as-needed basis. Thus, data backup is commonly used as a relatively less expensive redundancy technique to avoid total data loss whereas data replication is commonly used as a relatively more expensive redundancy technique to preserve availability and/or continuity of business processes after an outage.

SUMMARY

Aspects of the present disclosure are directed toward a computer-implemented method comprising selectively compressing and selectively encrypting, by a production site, a set of files for replication from the production site to a remote site, where files are selectively compressed based on a compression ratio satisfying a compression threshold, and where files are selectively encrypted based on a file content satisfying an encryption criteria. The method further comprises updating, by the production site, metadata associated with selectively compressed files and updating metadata associated with selectively encrypted files. The method further comprises replicating the set of files for replication from the production site to the remote site, where the set of files for replication includes selectively compressed and selectively encrypted files.

Additional aspects of the present disclosure are directed to systems and computer program products configured to perform the methods described above.

Further aspects of the present disclosure are directed toward a system comprising a remote site storing a batch of files for replication received from a production site, the batch of files for replication comprising selectively compressed and encrypted files for replication. The selectively compressed and encrypted files for replication can include a first file that is not compressed based on the first file not satisfying a compression threshold and not encrypted based on the first file not satisfying an encryption criteria, a first metadata corresponding to the first file and indicating that the first file is not compressed and not encrypted, a second file that is compressed based on the second file satisfying the compression threshold and is encrypted based on the second file satisfying the encryption criteria, and a second metadata corresponding to the second file and indicating that the second file is compressed, that the second file is encrypted, and an order of the compression and the encryption. The system can be further configured such that the remote site stores the batch of files for replication including the second file, where the second file is decompressed and decrypted according to the order in the second metadata.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
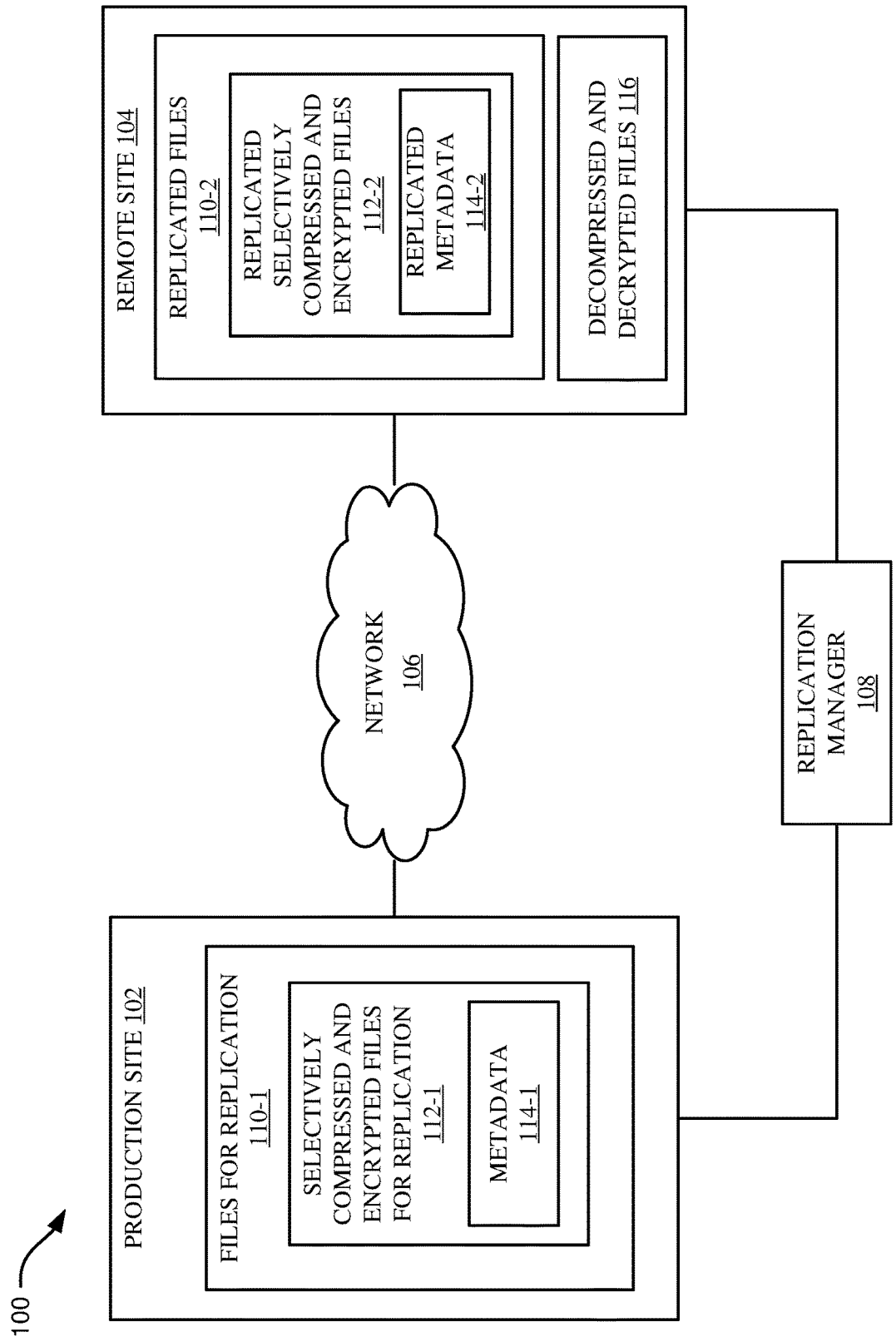
FIG. 1 illustrates a block diagram of a data storage environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data storage, and, more specifically, to reliability, efficiency, and security in data backup and data replication operations. While not limited to such applications, embodiments of the present disclosure may be better understood in light of the aforementioned context.

In data storage environments (e.g., a storage-area-network (SAN) data storage environment, a cloud-based data storage environment, etc.), data can be copied, backed up, and/or replicated to a remote site for disaster recovery purposes. In some situations, data is compressed prior to transmission to the remote site, where the data compression represents the data using fewer bits than the number of bits originally used to represent the data. Thus, data compression can increase efficiency in data storage environments by reducing the amount of data transmitted to the remote site during replication and/or backup operations.

In some situations, data is encrypted prior to transmission to the remote site, where the data encryption enables sensitive data to be transmitted to the remote site such that the data cannot be maliciously used if it is intercepted during transmission to the remote site. Thus, data encryption can increase security in data storage environments by mitigating the risk of sensitive data being exploited during transmission to the remote site.

However, uniformly applying data compression and/or data encryption to all data that is transmitted to the remote site is time-consuming, costly, inefficient, and unnecessary. For example, some data is more compressible than other data. As one example, text files, database files, and other similar file types are highly compressible whereas video files and/or image files are often less compressible. Since compressing data requires time and processing resources, it is beneficial to only compress data where the reduced bandwidth to transmit the compressed files outweighs the computational cost of compressing and decompressing the files.

Similarly, some data benefits from being encrypted whereas other data does not necessarily benefit from being encrypted. As one example, sensitive data, such as personal data, personally identifiable data, confidential data, financial data, and the like, may benefit from being encrypted, whereas non-sensitive data (e.g., a published weather report) may not need to be encrypted.

Aspects of the present disclosure address the aforementioned technical challenge by selectively compressing and selectively encrypting data that is to be transmitted to a remote site for data backup and/or data replication operations. Selectively compressing and selectively encrypting data can result in some files be compressed and encrypted, some files be compressed and not encrypted, some files being encrypted and not compressed, and some files being neither compressed nor encrypted. Decisions on whether to compress and/or encrypt files can be made on a file-by-file (or other data set size) basis. Furthermore, selective compression and selective encryption can be performed at a production site before starting any backup/replication process (i.e., before actually starting the data transfer from the production site to a remote site). Alternatively, the production site can perform selective compression and selective encryption on the fly while doing the backup/replication (i.e., for each file, determine whether to perform compression and/or encryption, generate metadata, and send the metadata and file to the remote site before proceeding to a next file). Similar to the production site, the remote site can perform decryption and/or decompression on received files after the backup/replication process is completed (i.e., when full data transfer is received at the remote site), or the remote site can perform decryption and/or decompression on the fly (i.e., immediately upon receiving a file from the production site). Furthermore, these variations (on-the-fly processing vs. batch processing) can be selected independently by the production site and the remote site. As examples, the production site can perform selective encryption/compression using batch processing, whereas the remote site can perform decryption and decompression using on-the-fly processing (or vice versa). Further still, in some embodiments, both the production site and the remote site utilize batch processing or both the production site and the remote site utilize on-the-fly processing.

Thus, aspects of the present disclosure can improve the security and efficiency of data backup and/or data replication operations. Nonetheless, any advantages related to the present disclosure are example advantages and embodiments can exist realizing all, some, or none of the advantages described herein while remaining within the spirit and scope of the present disclosure.

Referring now to FIG. 1, illustrated is a data storage environment 100 including a production site 102 communicatively coupled to a remote site 104 via a network 106. Network 106 can be any wireless, wired, or combination of wireless and wired networks capable of providing data transmission capabilities between production site 102 and remote site 104.

Production site 102 can store data that is actively used by applications and programs. Production site 102 can further store data that is readable, writable, creatable, and/or deletable by users interacting with programs, applications, and interfaces utilizing data stored in production site 102. Production site 102 can include, for example, computers, servers, mainframes, storage volumes, disk drives, flash drives, processors, and the like. The resources of production site 102 can include physical resources and/or virtually provisioned resources.

Remote site 104 can store copies of data from production site 102 for disaster recovery, backup, and/or redundancy purposes. Remote site 104 can include, for example, computers, servers, mainframes, storage volumes, disk drives, flash drives, tape drives, processors, and the like. The resources of production site 102 can include physical resources and/or virtually provisioned resources. Although a single remote site 104 is shown, in embodiments, data from production site 102 is replicated to numerous remote sites 104.

Data storage environment 100 also includes a replication manager 108 configured to selectively compress and/or selectively encrypt data prior to, or during, transmission of data from production site 102 to remote site 104 via network 106 in order to improve efficiency (by selective compression) and improve security (by selective encryption). Likewise, replication manager 108 can be configured to decompress and decrypt selectively compressed and encrypted data received at remote site 104. Replication manager 108 can store computer-executable algorithms, processes, programs, applications, and/or code configured to identify and selectively apply data compression (and decompression) operations and/or data encryption (and decryption) operations to data on production site 102 and/or data on remote site 104. Although shown as a communicatively coupled to both production site 102 and remote site 104, replication manager 108 can alternatively be incorporated int one or each of production site 102 and/or remote site 104, distributed between production site 102 and remote site 104, or virtually provisioned on an as-needed basis to one or each of production site 102 and/or remote site 104 in accordance with various embodiments of the present disclosure.

Production site 102 includes files for replication 110-1. Files for replication 110-1 can include any number of files associated with, for example, a file system, a snapshot, and the like. Based on instructions received from replication manager 108, production site 102 can be configured to generate selectively compressed and encrypted files for replication 112-1. Selectively compressed and encrypted files for replication 112-1 can include subsets of files in files for replication 110-1 such as a first subset of files that are neither compressed nor encrypted, a second subset of files that are compressed and not encrypted, a third subset of files that are not compressed and are encrypted, and/or a fourth subset of files that are both compressed and encrypted.

Selectively compressed and encrypted files for replication 112-1 can include metadata 114-1 that can include, for each file in selectively compressed and encrypted files for replication 112-1, an indication of whether the file is compressed, a compression and/or decompression scheme for files that are compressed, an indication of whether the file is encrypted, an encryption and/or decryption scheme for files that are encrypted, and/or an order of compression and encryption for files that are both encrypted and compressed.

Files for replication 110-1, including selectively compressed and encrypted files for replication 112-1 and associated metadata 114-1, can be transmitted to remote site 104 via network 106. Remote site 104 thus includes replicated files 110-2 corresponding to files for replication 110-1, replicated selectively compressed and encrypted files 112-2 corresponding to selectively compressed and encrypted files for replication 112-1, and replicated metadata 114-2 corresponding to metadata 114-1. Further, remote site 104 includes decompressed and decrypted files 116 that are files from replicated selectively compressed and encrypted files 112-2 that are decompressed and/or decrypted according to information stored in replicated metadata 114-2. Replicated files 110-2 and decompressed and decrypted files 116 can be stored at remote site 104 for availability, redundancy, backup, and/or other data reliability purposes.

The aforementioned block diagram can include more components, fewer components, and/or different components than the components explicitly shown while remaining within the spirit and scope of the present disclosure. Likewise, the components shown in the block diagram can be separated from one another, combined with one another, integrated within one another, and/or otherwise communicatively coupled together in other arrangements than the arrangement shown in FIG. 1 while remaining within the spirit and scope of the present disclosure.

Figure 2:
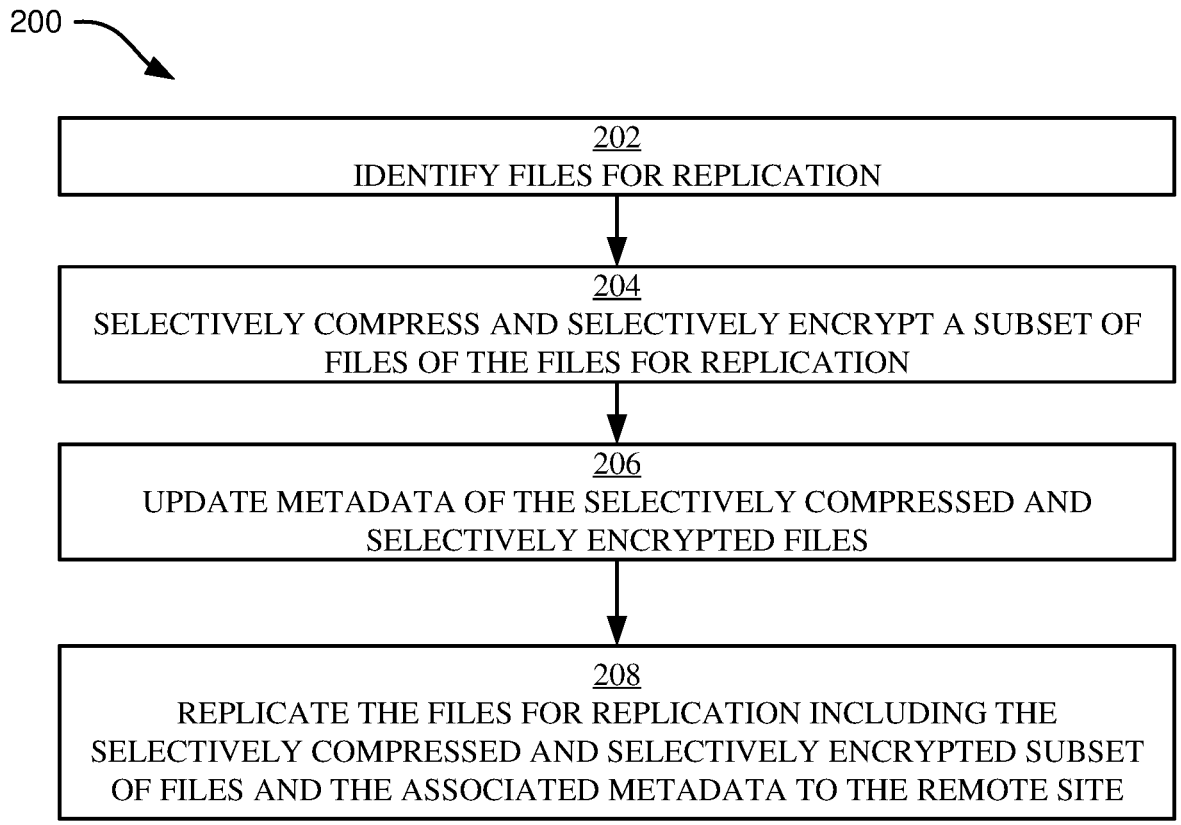
FIG. 2 illustrates a flowchart of an example method for selective compression and selective encryption of data for replication, in accordance with embodiments of the present disclosure.

Referring now to FIG. 2, illustrated is a flowchart of an example method 200 for selectively compressing and/or selectively encrypting files for replication, in accordance with embodiments of the present disclosure. The method 200 can be implemented by production site 102, replication manager 108, or a different configuration of hardware and/or software. As discussed in further detail in FIGS. 4 and 5, selectively compressing and/or selecting encrypting files can occur on a batch-basis or on a file-by-file (e.g., on-the-fly) basis in various embodiments.

At operation 202, the production site 102 identifies files for replication (e.g., files for replication 110-1). Files for replication can include a plurality of files (e.g., one or more batches of files, where each batch can contain tens, hundreds, thousands, or millions of files). Files for replication can include files of a variety of file types including, for example, text-based files, image-based files, video-based files, audio-based files, and the like.

At operation 204, the production site 102 selectively compresses and selectively encrypts a subset of the files for replication (e.g., selectively compressed and encrypted files for replication 112-1). For example, operation 204 can selectively compress files with a compressability satisfying a compression threshold (e.g., text-based files) while not compressing files with compressability not satisfying the compression threshold (e.g., image-based files, video-based files, etc.). Likewise, operation 204 can selectively encrypt files satisfying an encryption criteria (e.g., files containing private information, confidential information, personally identifiable information, etc.) while not encrypting files not satisfying the encryption criteria.

At operation 206, the production site 102 can update metadata of the selectively compressed and selectively encrypted files from operation 204 (e.g., metadata 114-1). Updating metadata can include an indication of whether or not the file is compressed, compression information for files that are compressed, an indication of whether or not the file is encrypted, encryption information for files that are encrypted, and/or an order of compression and encryption for files that are both compressed and encrypted.

At operation 208, the production site 102 replicates the files for replication including the selectively compressed and selectively encrypted files and their associated metadata to the remote site 102 via the network 106.

Overall, the method 200 can result in improved efficiency at least insofar as (1) operation 208 requires reduced bandwidth to transmit selectively compressed files, (2) operation 204 reduces compression processing overhead by only compressing files satisfying a compression threshold, and/or (3) operation 204 reduces encryption processing overhead by only encrypting files satisfying an encryption criteria. The method 200 can also result in improved security at least insofar as operation 208 transmits encrypted files containing sensitive information.

The aforementioned operations can be completed in any order and are not limited to those described. Additionally, some, all, or none of the aforementioned operations can be completed, while still remaining within the spirit and scope of the present disclosure.

Figure 3:
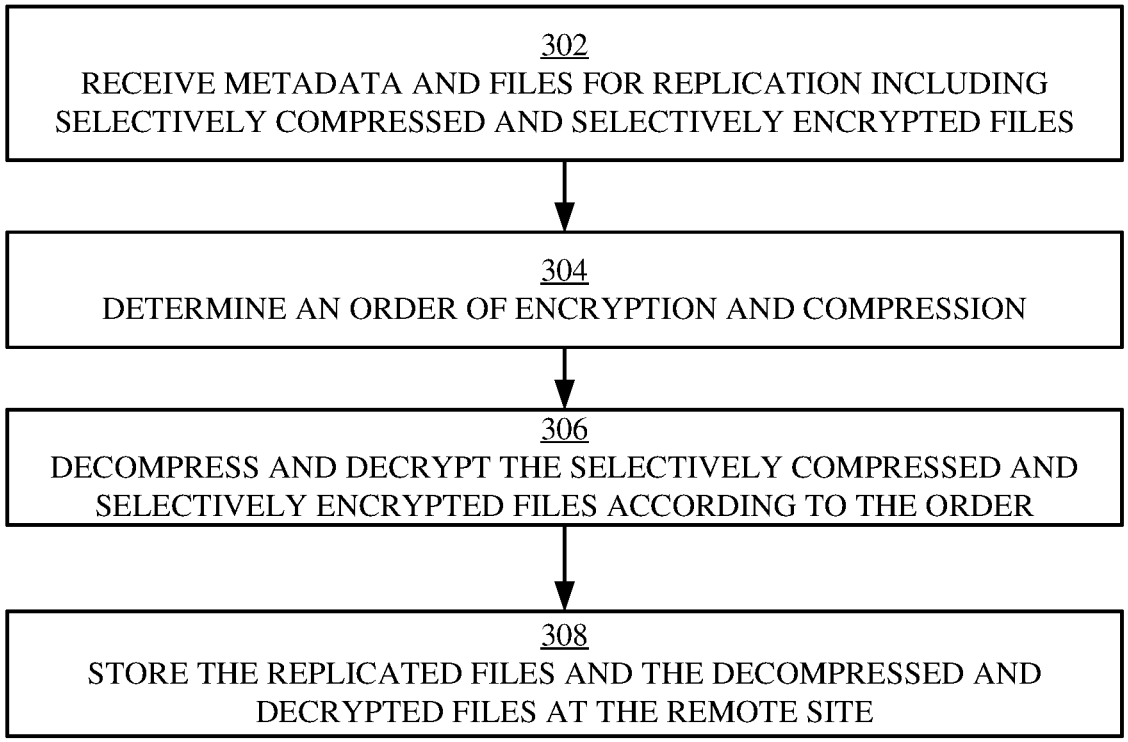
FIG. 3 illustrates a flowchart of an example method for decompression and decryption of selectively compressed and selectively encrypted files, in accordance with embodiments of the present disclosure.

Referring now to FIG. 3, illustrated is a flowchart of an example method 300 for receiving selectively compressed and encrypted files for replication at a remote site 104, in accordance with embodiments of the present disclosure. The method 300 can be implemented by a remote site 104, a replication manager 108, or a different configuration of hardware and/or software. Decompression and/or decryption of files can occur on a batch-basis or on a file-by-file (e.g., on-the-fly) basis in various embodiments.

At operation 302, the remote site 104 receives replicated files (e.g., replicated files 110-2). The replicated files can include selectively compressed and selectively encrypted files (e.g., replicated selectively compressed and encrypted files 112-2) and metadata (e.g., replicated metadata 114-2).

At operation 304, the remote site 104 can determine an order of encryption and compression in order to appropriately decrypt and decompress files that are both encrypted and compressed. Operation 304 can include determining an order of encryption and compression based on an indication of the order of compression and encryption stored in metadata associated with the replicated selectively compressed and selectively encrypted files.

At operation 306, the remote site 104 decompresses and decrypts the replicated selectively compressed and selectively encrypted files according to the order determined in operation 304. In some embodiments, operation 306 includes decompressing compressed files according to a decompression scheme indicated in the metadata. Likewise, in some embodiments, operation 306 includes decrypting encrypted files according to a decryption scheme indicated in the metadata.

At operation 308, the remote site 104 stores the replicated files including the decompressed and/or decrypted files (e.g., decompressed and decrypted files 116) at the remote site 104. Storing the files can include, for example, writing the files to a disk drive, a tape drive, a flash drive, or a different physical or virtual storage volume.

The aforementioned operations can be completed in any order and are not limited to those described. Additionally, some, all, or none of the aforementioned operations can be completed, while still remaining within the spirit and scope of the present disclosure.

Figure 4:
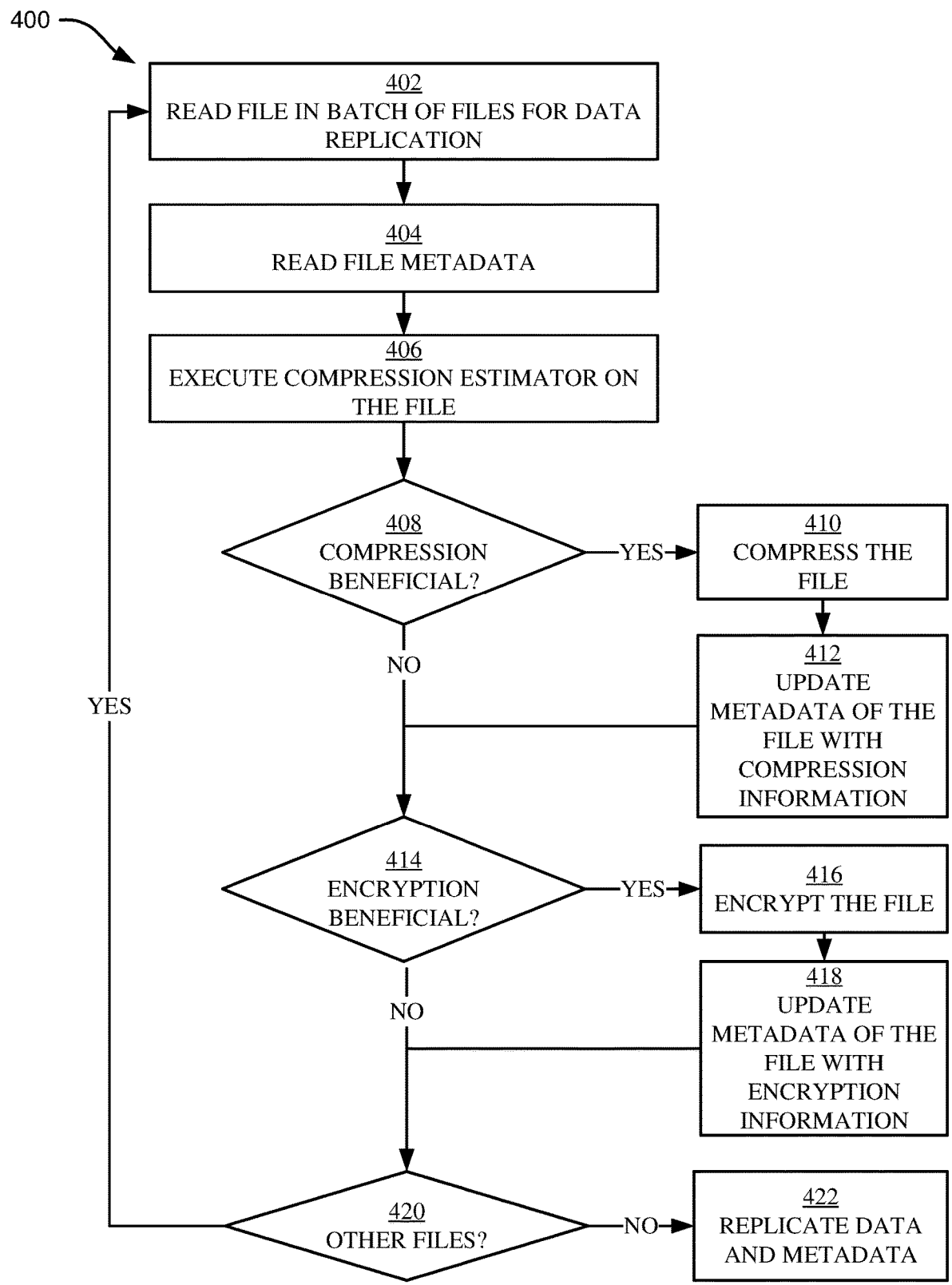
FIG. 4 illustrates a flowchart of an example method for selective compression and selective encryption of data for replication prior to migration, in accordance with embodiments of the present disclosure.

Referring now to FIG. 4, illustrated is a flowchart of an example method 400 for selective compression and encryption of data for replication prior to migration. In some embodiments, the method 400 is a more detailed example of the method 200 described above with respect to FIG. 2. In some embodiments, the method 400 is implemented by a production site 102, a replication manager 108, or a different configuration of hardware and/or software.

Operation 402 includes reading a file from a batch of files that are to be replicated from a production site 102 to a remote site 104. Operation 404 includes reading metadata associated with the file read in operation 402. Metadata can include, for example, a file size, a file type, a file extension (e.g., .doc, .txt, .ppt, .xcl, etc.), a file classification (e.g., sensitive data, non-sensitive data, etc.), a file identifier (e.g., a name, an alphanumeric code, etc.).

Operation 406 includes executing a compression estimator on the file. Compression estimators can include, but are not limited to, IBM Comprestimator, Oracle Advanced Compression Advisor, Structured Query Language (SQL) Server Compression Estimator, and/or other compression estimator utilities, engines, services, applications, and the like. Operation 406 can output an estimated data compression ratio or a different indication of compressibility of the file read in operation 402.

Operation 408 includes determining if the compression is beneficial for data replication. In some embodiments, operation 408 is based on file type, where text-based files are compressed and image-based or video-based files are not compressed. In such embodiments, files with preconfigured extensions (e.g., .doc, .docx, .txt, .xcl, .ppt, etc.) are compressed whereas files with other preconfigured extensions (e.g., a .mp3, .mp4, .tiff, .jpeg, .bmp, .avi, .flv, .wmv, .mov, etc.) are not compressed. In other embodiments, operation 408 includes determining if the data compression ratio and corresponding network bandwidth reduction achieved as a result of the data compression outweighs the processing resources and time required to compress the data. In such embodiments, files may be compressed if the data compression ratio (e.g., uncompressed file size divided by compressed file size) satisfies a threshold (e.g., greater than two, greater than five, etc.).

If the compression is beneficial (408: YES), the method 400 proceeds to operation 410 and compresses the file. File compression can include, but is not limited to, data compression, source-coding, and/or bit-rate reduction. File compression can include lossless data compression or lossy data compression. File compression can utilize proprietary, open-source, or retail software such as, but not limited to, WinZip, 7-Zip, WinRAR, PeaZip, and/or other file compression utilities.

Operation 412 updates the metadata of the file with the compression information (if any). For example, the metadata of the file can include an indication of whether or not the file is compressed, an indication of a type of compression used, and/or information related to decompressing a compressed file.

The method 400 then proceeds to operation 414. Likewise, if it is determined that compression is not beneficial (408: NO), the method 400 proceeds directly to operation 414.

Operation 414 determines if encryption is beneficial. In some embodiments, encryption is determined to be beneficial if there is a direct or indirect indication that the content in the file selected in operation 402 contains sensitive data (e.g., satisfies an encryption criteria) such as personal information, personally identifiable information, classified information, confidential information, private information, trade secret information, proprietary information, financial information, and/or other information that is deemed sensitive. Likewise, operation 414 can determine encryption is not beneficial for data lacking an indication of sensitive data or containing an explicit indication tagging the data as not being sensitive. Indications of sensitive data can be explicitly contained in metadata of a file and/or inferred from natural language processing (NLP) and/or other machine learning algorithms and techniques performed on the content of the file, the source of the file, and/or the type of file.

If it is determined that encryption is beneficial (414: YES), the method 400 proceeds to operation 416 and encrypts the file. Encryption can include, but is not limited to, symmetric key encryption, asymmetric key encryption, public-key encryption, and/or other encryption techniques. Operation 416 can utilize any number of encryption techniques such as, but not limited to, Advanced Encryption Standard (AES), Triple Data Encryption Standard (3DES), Twofish, Rivest, Shamir, Adelman (RSA), and the like.

The method 400 then proceeds to operation 418 and updates the metadata of the file with encryption information. Updating the metadata of the file can include an indication of whether the file is encrypted or not, a type of encryption used if the file is encrypted, and/or information related to decrypting the file.

The method 400 then proceeds to operation 420. Likewise, if it is determined that encryption is not beneficial at operation 414 (414: NO), the method 400 proceeds directly to operation 420.

Operation 420 includes determining if there are other files in the batch of files including the file originally selected in operation 402 that are slated for transmission to the remote site 104. If so (420: YES), then the method 400 returns to operation 402 and selects another file from the batch of files slated for transmission to the remote site 104. If not (420: NO), then the method 400 proceeds to operation 422 and replicates the data and metadata associated with the batch of files to the remote site 104 using the network 106.

Figure 5:
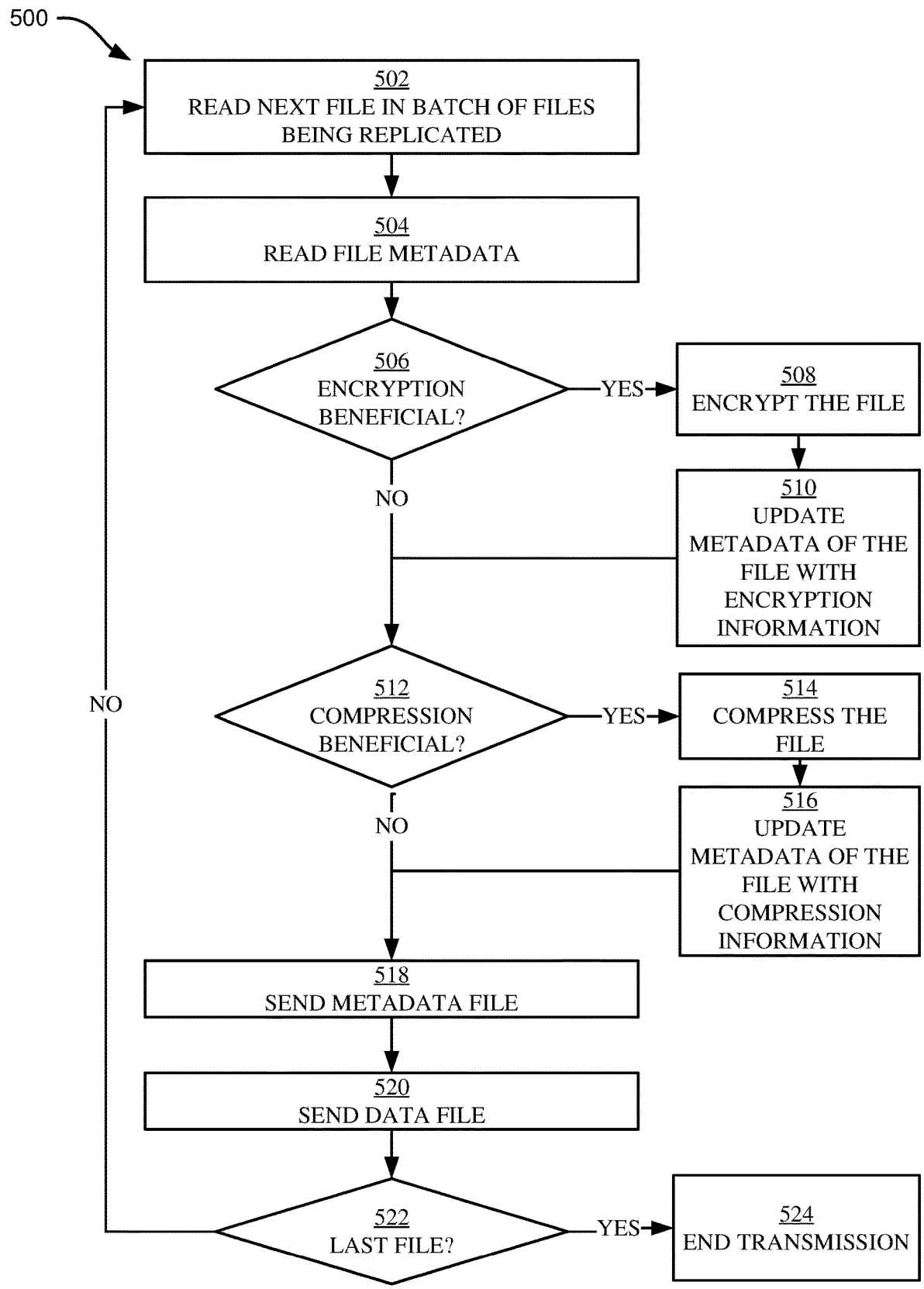
FIG. 5 illustrates a flowchart of an example method for selective compression and selective encryption of data for replication during migration, in accordance with embodiments of the present disclosure.

As will be noted by a comparison of FIG. 4 and FIG. 5, FIG. 4 illustrates compression occurring before encryption. However, this is illustrative and is not to be taken in a limiting sense. In fact, in alternative embodiments, encryption occurs before compression in the method 400.

The aforementioned operations can be completed in any order and are not limited to those described. Additionally, some, all, or none of the aforementioned operations can be completed, while still remaining within the spirit and scope of the present disclosure.

Referring now to FIG. 5, illustrated is a flowchart of an example method 500 for selective compression and selective encryption of data for replication during migration. In some embodiments, the method 500 is a more detailed example of the method 200 described above with respect to FIG. 2. The method 500 can be implemented by a production site 102, a replication manager 108, or a different configuration of hardware and/or software.

Operation 502 includes reading a next file in a batch of files that is in the process of being replicated from a production site 102 to a remote site 104. Operation 504 includes reading file metadata associated with the file selected in operation 502. Operation 504 can be consistent with operation 404 of FIG. 4.

Operation 506 includes determining if encryption is beneficial. If encryption is beneficial (506: YES), the method 500 can proceed to operation 508 and encrypt the file and then proceed to operation 510 and update the metadata of the file with the encryption information before proceeding operation 512. If encryption is not beneficial (506: NO), the method 500 can proceed to operation 512. Operations 506-510 can be consistent with operations 414-418 of FIG. 4.

Operation 512 includes determining if compression is beneficial. Although not explicitly shown, operation 512 can also include using a compression estimator as previously discussed in operation 406 of FIG. 4.

If compression is beneficial (506: YES), the method 500 can proceed to operation 514 and compress the data and then proceed to operation 516 and update the metadata of the file with the compression information before proceeding to operation 518. If compression is not beneficial (506: NO), the method 500 can proceed to operation 518. Operations 512-516 can be consistent with operations 408-412 of FIG. 4.

Operation 518 sends the metadata file from the production site 102 to the remote site 104 via the network 106. The method 500 then proceeds to operation 520 and sends the data file (which may be encrypted, compressed, both, or neither) from the production site 102 to the remote site 104 via the network 106.

In operation 522, the method 500 determines if the file sent in operation 520 was the last file of the batch of files that is in the process of being replicated from the production site 102 to the remote site 104. If not (522: NO), the method 500 returns to operation 502 and selects a next file in the batch of files. If so (522: YES), the method 500 proceeds to operation 524 and ends the transmission of replication data from the production site 102 to the remote site 104.

As will be noted by a comparison of FIG. 4 and FIG. 5, FIG. 5 illustrates encryption occurring before compression. However, this is illustrative and is not to be taken in a limiting sense. In fact, in alternative embodiments, compression occurs before encryption in the method 500.

The aforementioned operations can be completed in any order and are not limited to those described. Additionally, some, all, or none of the aforementioned operations can be completed, while still remaining within the spirit and scope of the present disclosure.

Figure 6:
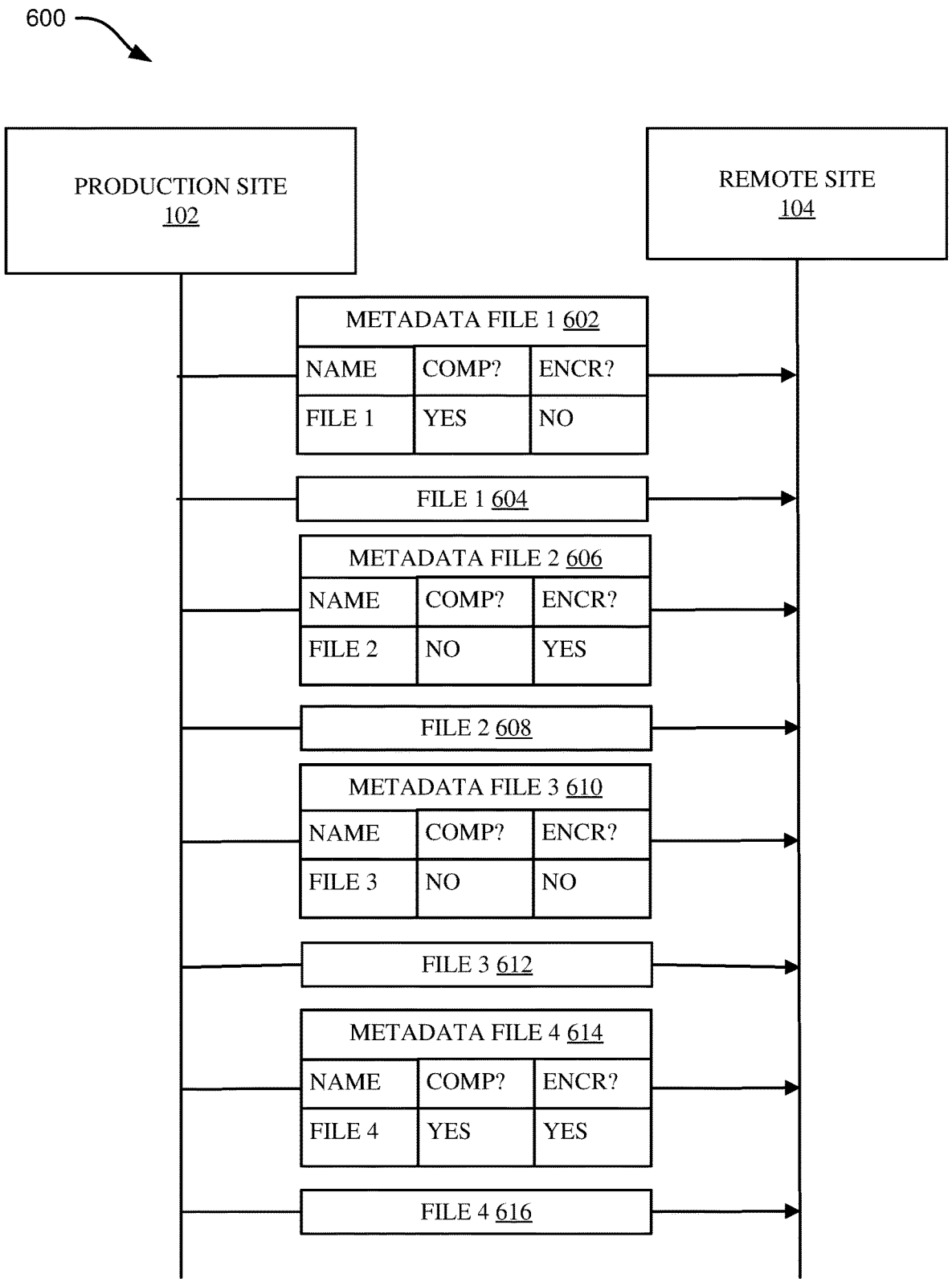
FIG. 6 illustrates a diagram of selectively compressed and selectively encrypted files replicated to a remote site, in accordance with embodiments of the present disclosure.

Referring now to FIG. 6, illustrated is a data flow diagram 600 illustrating the various types of files that can be transmitted using the selective compression and selective encryption techniques discussed in the present disclosure.

In one example, metadata from file 1 602 is transmitted from production site 102 to remote site 104, where the metadata for file 1 602 indicates a file name (file 1), a compression status (yes), and an encryption status (no). After transmitting the metadata for file 1 602 to the remote site 104, the file 1 604 is transmitted from production site 102 to remote site 104, where file 1 604 is compressed but not encrypted consistent with the data in the metadata for file 1 602.

As another example, metadata from file 2 606 is transmitted from the production site 102 to the remote site 104, where the metadata for file 2 606 indicates a file name (file 2), a compression status (no), and an encryption status (yes). File 2 608 can then be transferred from the production site 102 to the remote site 104, where the file 2 608 is not compressed and is encrypted.

As another example, metadata from file 3 610 is transmitted from the production site 102 to the remote site 104, where the metadata for file 3 612 indicates a file name (file 3), a compression status (no), and an encryption status (no). File 3 612 can then be transferred from the production site 102 to the remote site 104, where the file 3 612 is not compressed and is not encrypted.

As another example, metadata from file 4 614 is transmitted from production site 102 to the remote site 104, where the metadata for file 4 614 indicates a file name (file 4), a compression status (yes), and an encryption status (yes). After transmitting the metadata for file 4 614 to the remote site 104, the file 4 616 can be transmitted to the remote site 104, where the file 4 616 is compressed and encrypted.

Although not explicitly shown, metadata (e.g., 602, 606, 610, and/or 614) can also include information related to compression and/or decompression of compressed files, information related to encryption and/or decryption of encrypted files, and/or an order of compression and encryption for files that are both encrypted and compressed.

Figure 7:
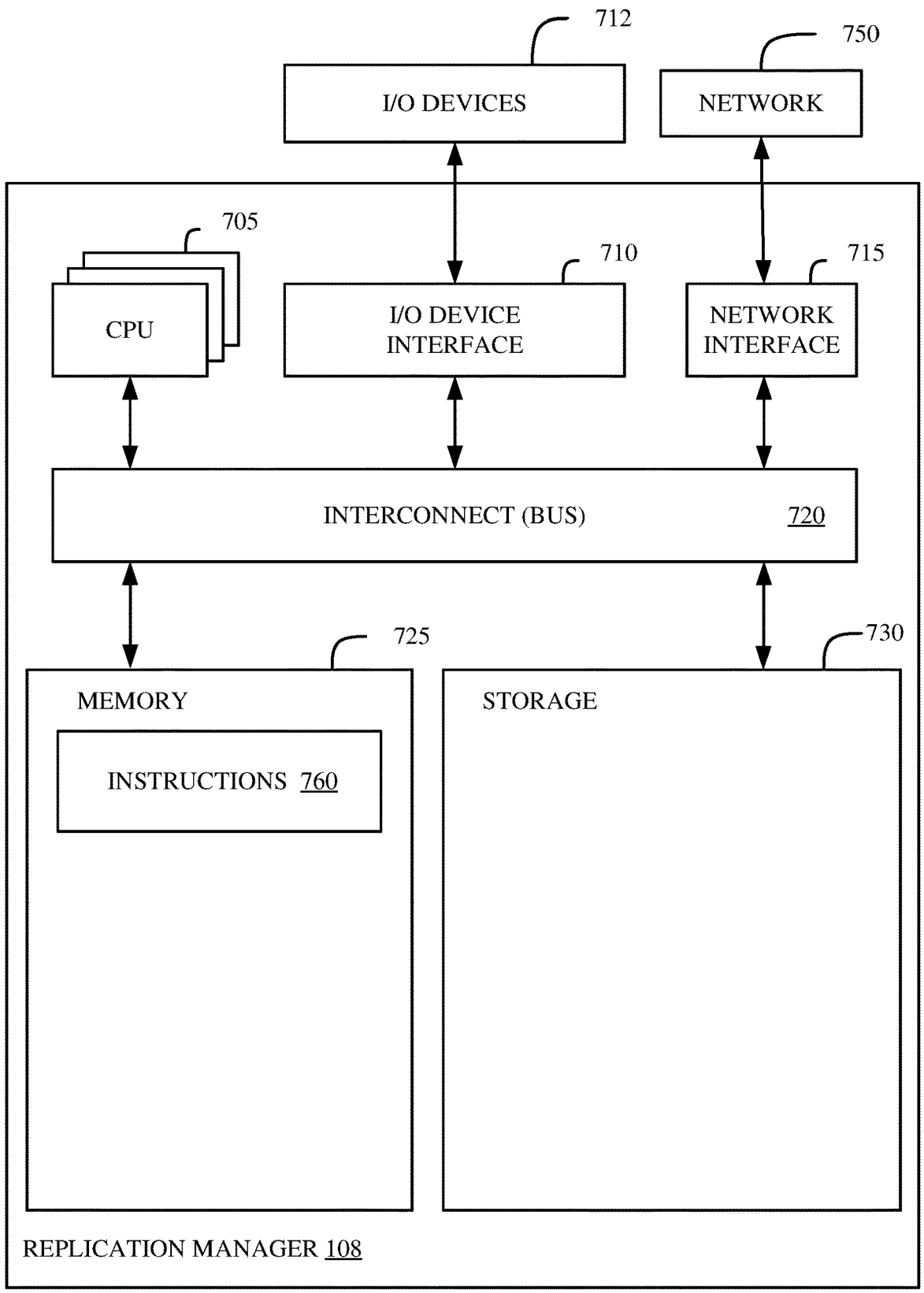
FIG. 7 illustrates a block diagram of an example replication manager, in accordance with embodiments of the present disclosure.

FIG. 7 illustrates a block diagram of an example replication manager 108 in accordance with some embodiments of the present disclosure. In various embodiments, replication manager 108 can perform the methods described in FIGS. 2-5 and/or implement the functionality discussed in FIGS. 1 and 6. In some embodiments, replication manager 108 receives instructions related to aforementioned methods and functionalities by downloading processor-executable instructions from a remote data processing system via network 750. In other embodiments, replication manager 108 provides instructions for the aforementioned methods and/or functionalities to a client machine such that the client machine executes the method, or a portion of the method, based on the instructions provided by replication manager 108.

Replication manager 108 includes memory 725, storage 730, interconnect (e.g., BUS) 720, one or more CPUs 705 (also referred to as processors 705 herein), I/O device interface 710, I/O devices 712, and network interface 715.

Each CPU 705 retrieves and executes programming instructions stored in memory 725 or storage 730. Interconnect 720 is used to move data, such as programming instructions, between the CPUs 705, I/O device interface 710, storage 730, network interface 715, and memory 725. Interconnect 720 can be implemented using one or more busses. CPUs 705 can be a single CPU, multiple CPUs, or a single CPU having multiple processing cores in various embodiments. In some embodiments, CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random-access memory (e.g., static random-access memory (SRAM), dynamic random access memory (DRAM), or Flash). Storage 730 is generally included to be representative of a non-volatile memory, such as a hard disk drive, solid state device (SSD), removable memory cards, optical storage, or flash memory devices. In an alternative embodiment, storage 730 can be replaced by storage area-network (SAN) devices, the cloud, or other devices connected to replication manager 108 via I/O device interface 710 or network 750 via network interface 715.

In some embodiments, memory 725 stores instructions 760. However, in various embodiments, instructions 760 are stored partially in memory 725 and partially in storage 730, or they are stored entirely in memory 725 or entirely in storage 730, or they are accessed over network 750 via network interface 715.

Instructions 760 can be processor-executable instructions for performing any portion of, or all of, any of the methods of FIGS. 2-5 and/or implementing any of the functionality discussed in FIGS. 1 and 6.

In various embodiments, I/O devices 712 include an interface capable of presenting information and receiving input. For example, I/O devices 712 can present information to a user interacting with replication manager 700 and receive input from the user.

Replication manager 700 is connected to network 750 via network interface 715. Network 750 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
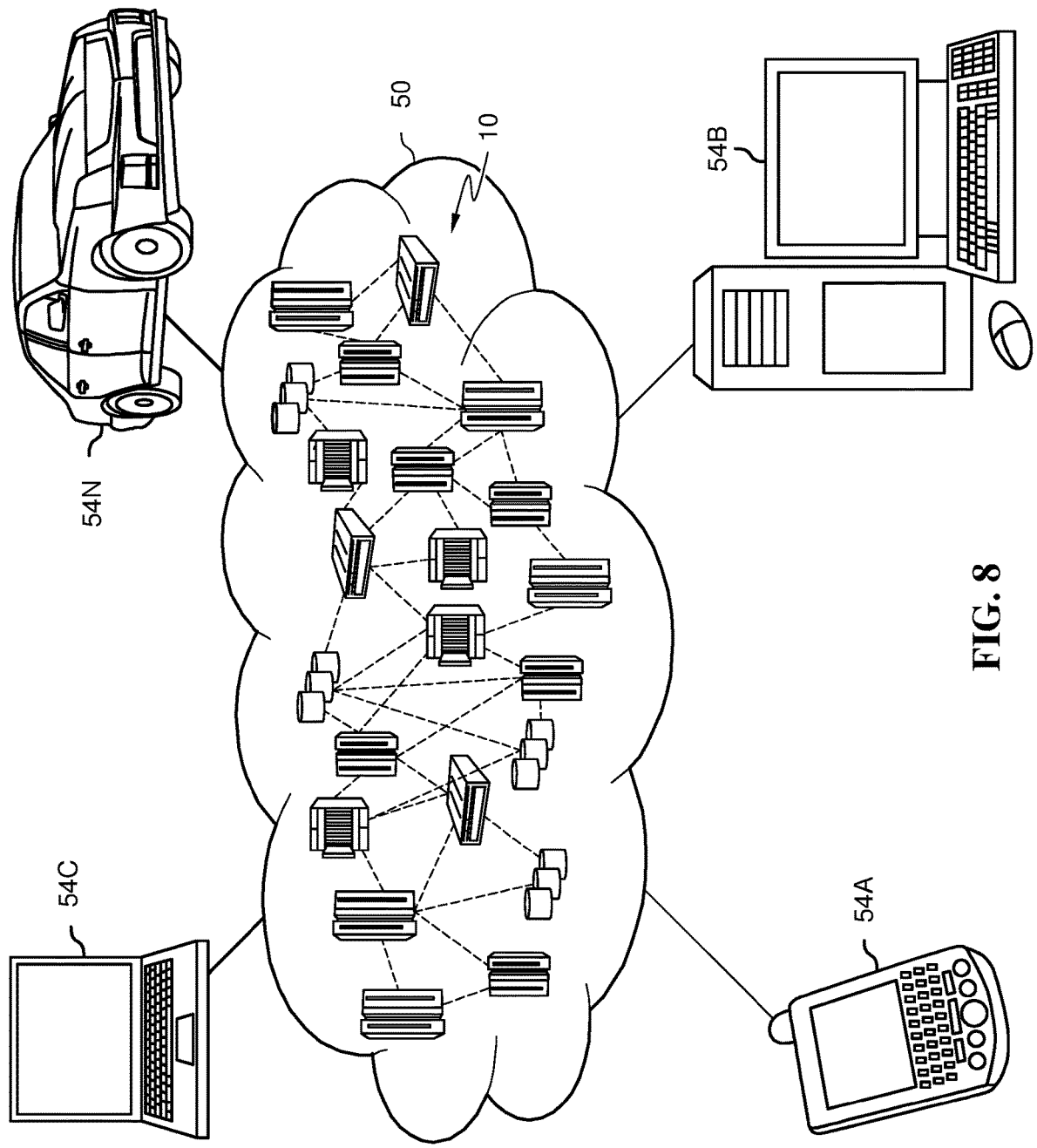
FIG. 8 depicts a cloud computing environment, according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
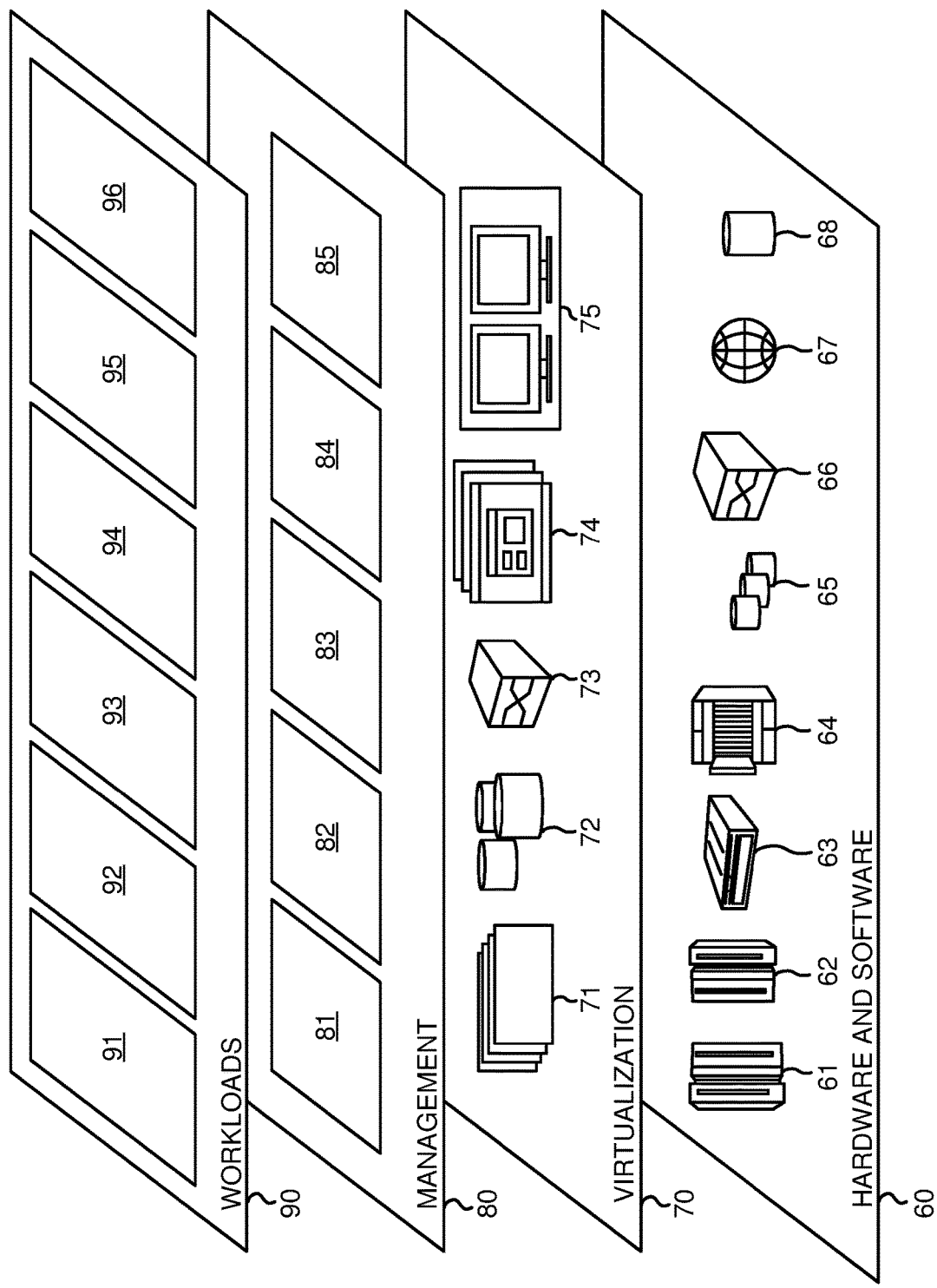
FIG. 9 depicts abstraction model layers, according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective compression and selective encryption for replication management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-5 and/or any of the functionality discussed in FIGS. 1 and 6) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
selectively compressing and selectively encrypting, by a production site, a set of files for replication from the production site to a remote site, wherein files are selectively compressed based on a compression ratio satisfying a compression threshold, wherein the compression ratio is estimated using a compression estimator, and wherein files are selectively encrypted based on a file content satisfying an encryption criteria, wherein a first subset of the set of files are compressed and encrypted, wherein a second subset of the set of files are compressed and not encrypted, wherein a third subset of the set of files are encrypted and not compressed, and wherein a fourth subset of the set of files are neither compressed nor encrypted;
updating, by the production site, metadata associated with the selectively compressed files that indicates the selectively compressed files are compressed and updating metadata associated with the selectively encrypted files that indicates the selectively encrypted files are encrypted; and
replicating the set of files for replication, including the selectively compressed and selectively encrypted files, from the production site to the remote site.

2. The method according to claim 1, wherein replicating the set of files further comprises:
transmitting metadata associated with a first file of the set of files for replication from the production site to the remote site; and
in response to transmitting the metadata associated with the first file, transmitting the first file from the production site to the remote site.

3. The method according to claim 2, wherein the metadata associated with the first file indicates that the first file is compressed, that the first file is encrypted, and an order of the compression and the encryption.

4. The method according to claim 3, wherein the method further comprises:
receiving, at the remote site, the metadata associated with the first file;
decrypting and decompressing the first file according to the order; and
storing the first file that is decrypted and decompressed at the remote site.

5. The method according to claim 1, wherein the compression ratio is based on a file type and a file size of respective files.

6. The method according to claim 1, wherein the encryption criteria comprises an indication of personally identifiable data.

7. The method according to claim 1, further comprising:
receiving, at the remote site, the set of files for replication including selectively compressed and selectively encrypted files;
determining, by the remote site, an order of encryption and compression based on metadata associated with the set of files for replication;
decompressing the selectively compressed files and decrypting the selectively encrypted files by the remote site; and
storing, in response to decompressing the selectively compressed files and decrypting the selectively encrypted files, the files for replication at the remote site.

8. The method according to claim 1, wherein replicating the set of files for replication further comprises:
transmitting a first file that is not encrypted and not compressed to the remote site;
transmitting a second file that is encrypted and not compressed to the remote site;
transmitting a third file is not encrypted and is compressed to the remote site; and
transmitting a fourth file that is encrypted and is compressed to the remote site.

9. The method according to claim 1, wherein the production site implements the method based on computer-executable instructions downloaded over a network to the production site from a remote data processing system.

10. A computer program product comprising a computer readable storage medium having program instructions embodied therewith, the program instructions executable by a processor to cause the processor to perform a method comprising:
selectively compressing and selectively encrypting, by a production site, a set of files for replication from the production site to a remote site, wherein files are selectively compressed based on a compression ratio satisfying a compression threshold, wherein the compression ratio is estimated using a compression estimator, and wherein files are selectively encrypted based on a file content satisfying an encryption criteria, wherein a first subset of the set of files are compressed and encrypted, wherein a second subset of the set of files are compressed and not encrypted, wherein a third subset of the set of files are encrypted and not compressed, and wherein a fourth subset of the set of files are neither compressed nor encrypted;
updating, by the production site, metadata associated with the selectively compressed files that indicates the selectively compressed files are compressed and updating metadata associated with the selectively encrypted files that indicates the selectively encrypted files are encrypted; and
replicating the set of files for replication, including the selectively compressed and selectively encrypted files, from the production site to the remote site.

11. The computer program product according to claim 10, wherein replicating the set of files further comprises:
transmitting metadata associated with a first file of the set of files for replication from the production site to the remote site; and
in response to transmitting the metadata associated with the first file, transmitting the first file from the production site to the remote site.

12. The computer program product according to claim 11, wherein the metadata associated with the first file indicates that the first file is compressed, that the first file is encrypted, and an order of the compression and the encryption.

13. The computer program product according to claim 12, wherein the method further comprises:
receiving, at the remote site, the metadata associated with the first file;
decrypting and decompressing the first file according to the order; and storing the first file that is decrypted and decompressed at the remote site.

14. The computer program product according to claim 10, wherein the compression ratio is based on a file type and a file size of respective files.

15. The computer program product according to claim 10, wherein the encryption criteria comprises an indication of personally identifiable data.

16. The computer program product according to claim 10, further comprising:
   receiving, at the remote site, the set of files for replication including selectively compressed and selectively encrypted files;
   determining, by the remote site, an order of encryption and compression based on metadata associated with the set of files for replication;
   decompressing the selectively compressed files and decrypting the selectively encrypted files by the remote site; and
   storing, in response to decompressing the selectively compressed files and decrypting the selectively encrypted files, the files for replication at the remote site.

17. The computer program product according to claim 10, wherein replicating the set of files for replication further comprises:
   transmitting a first file that is not encrypted and not compressed to the remote site;
   transmitting a second file that is encrypted and not compressed to the remote site;
   transmitting a third file is not encrypted and is compressed to the remote site; and
   transmitting a fourth file that is encrypted and is compressed to the remote site.

18. A system comprising:
   one or more processors; and
   one or more computer-readable storage media storing program instructions which, when executed by the one or more processors, are configured to cause the one or more processors to perform a method comprising:
   selectively compressing and selectively encrypting, by a production site, a set of files for replication from the production site to a remote site, wherein files are selectively compressed based on a compression ratio satisfying a compression threshold, wherein the compression ratio is estimated using a compression estimator, and wherein files are selectively encrypted based on a file content satisfying an encryption criteria, wherein a first subset of the set of files are compressed and encrypted, wherein a second subset of the set of files are compressed and not encrypted, wherein a third subset of the set of files are encrypted and not compressed, and wherein a fourth subset of the set of files are neither compressed nor encrypted;
   updating, by the production site, metadata associated with the selectively compressed files that indicates the selectively compressed files are compressed and updating metadata associated with the selectively encrypted files that indicates the selectively encrypted files are encrypted; and
   replicating the set of files for replication, including the selectively compressed and selectively encrypted files, from the production site to the remote site.

* * * * *